3 Sheets--Sheet 1.

H. BUMGARNER.
Gang-Plows.

No. 155,418.

Patented Sept. 29, 1874.

Witnesses:
G. B. Towles.
A. P. Lacey

Inventor:
Henry Bumgarner
By W. Burris Atty

H. BUMGARNER.
Gang-Plows.

No. 155,418. Patented Sept. 29, 1874.

Witnesses:
G. B. Towles.
A. V. Lacey

Inventor:
Henry Bumgarner
By W. Burris
Atty

H. BUMGARNER.
Gang-Plows.

No. 155,418.

3 Sheets--Sheet 3.

Patented Sept. 29, 1874.

Witnesses:
G. B. Towles
A. T. Lacey

Inventor:
Henry Bumgarner
By W. Burris Atty

UNITED STATES PATENT OFFICE.

HENRY BUMGARNER, OF DECATUR, IOWA.

IMPROVEMENT IN GANG-PLOWS.

Specification forming part of Letters Patent No. 155,418, dated September 29, 1874; application filed July 11, 1874.

*To all whom it may concern:*

Be it known that I, HENRY BUMGARNER, of Decatur, in the county of Decatur and State of Iowa, have invented certain new and useful Improvements in Gang-Plows and Single Plows; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1:
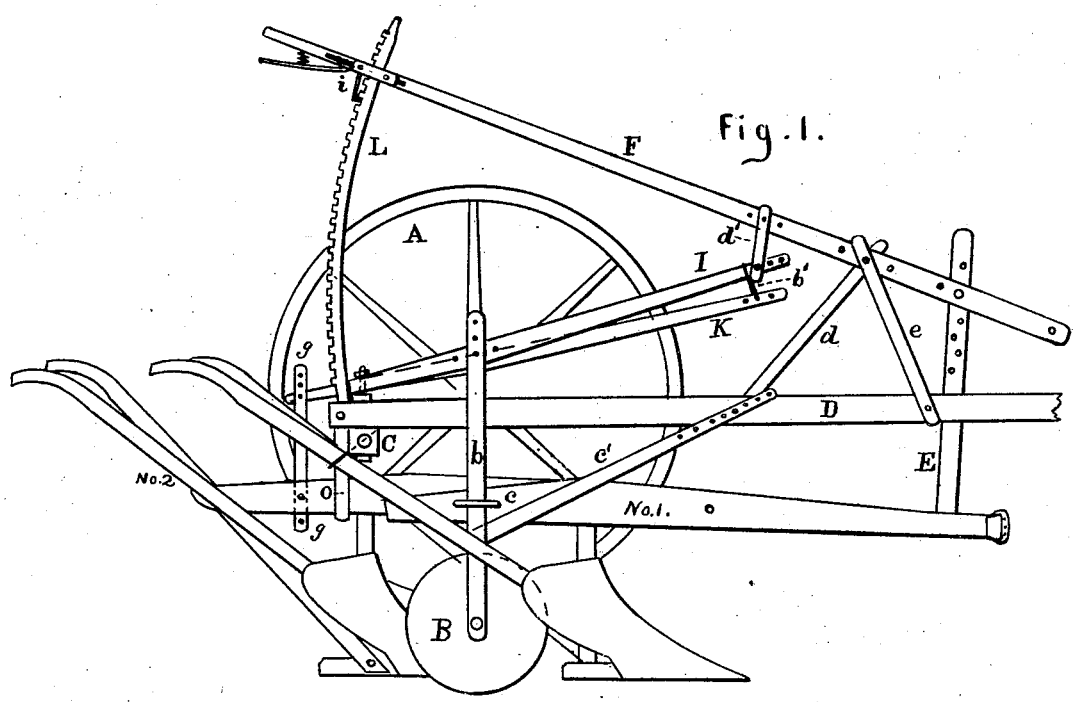
Figure 2:
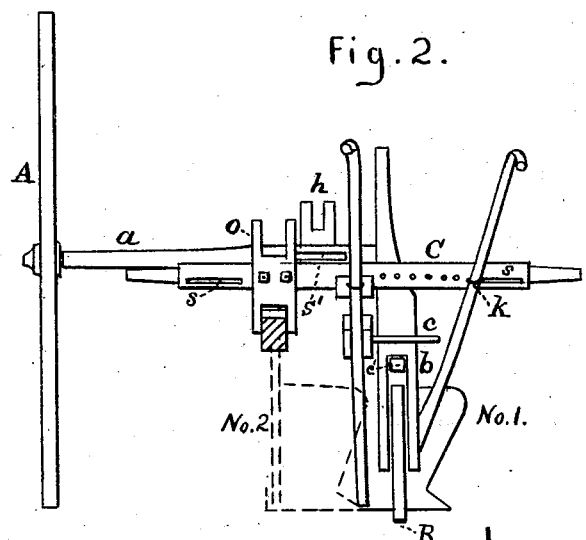
Figure 3:
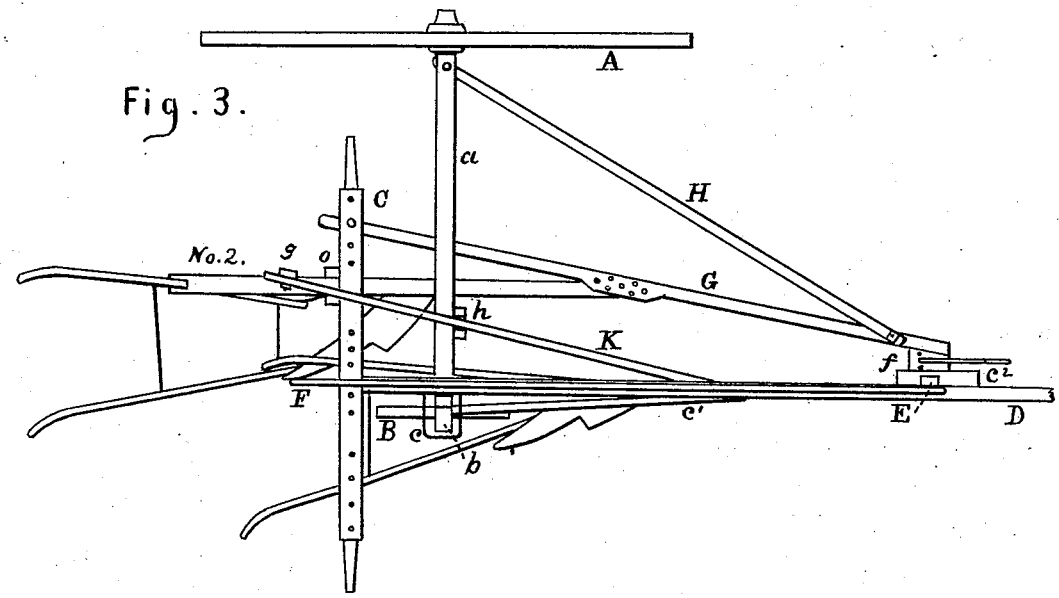
Figure 4:
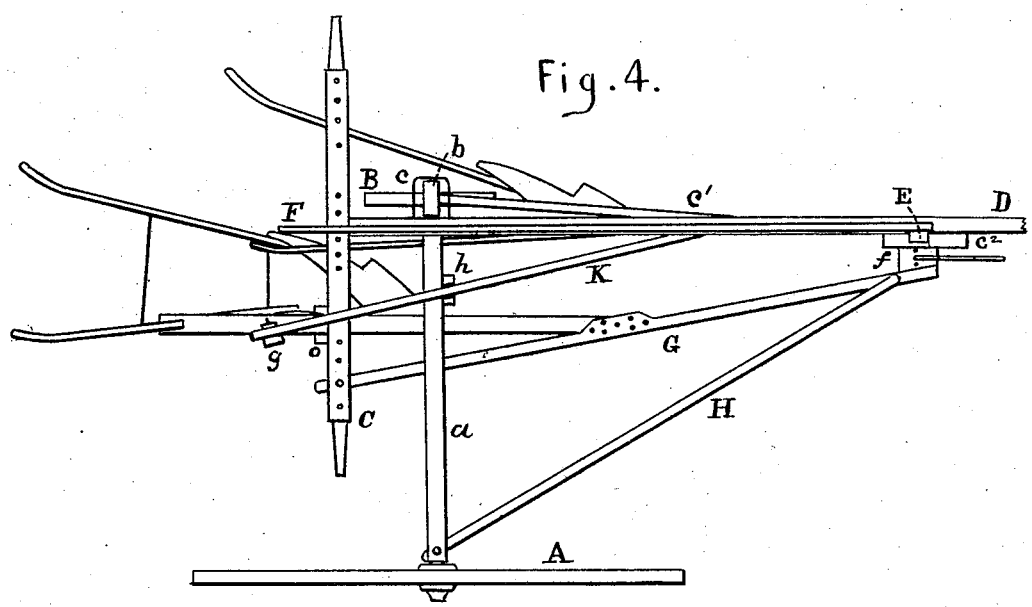
Figure 5:
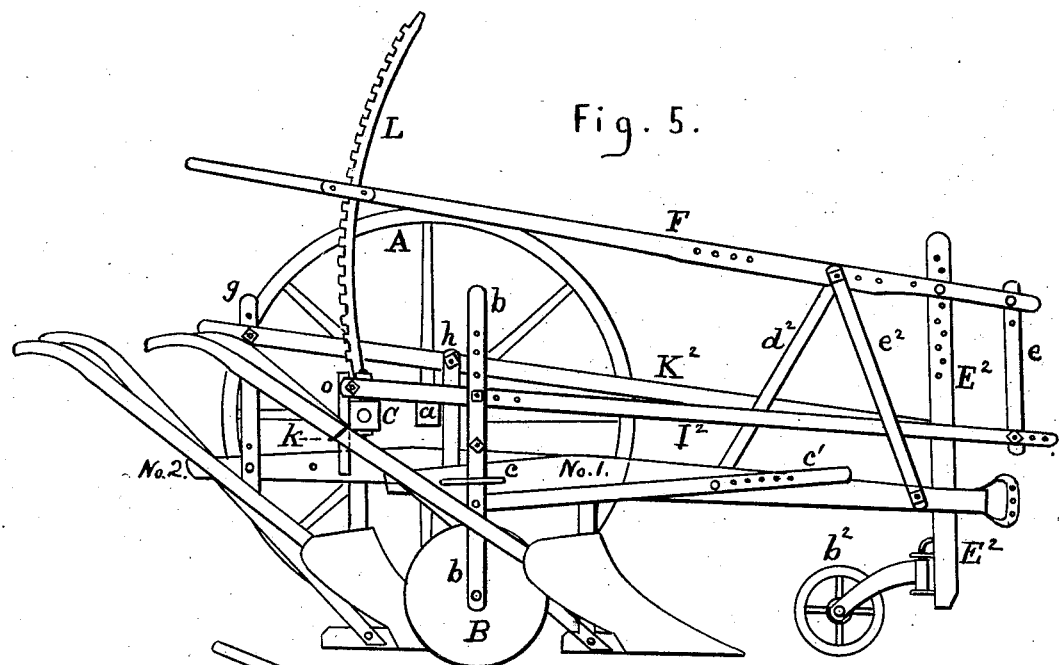
Figure 6:
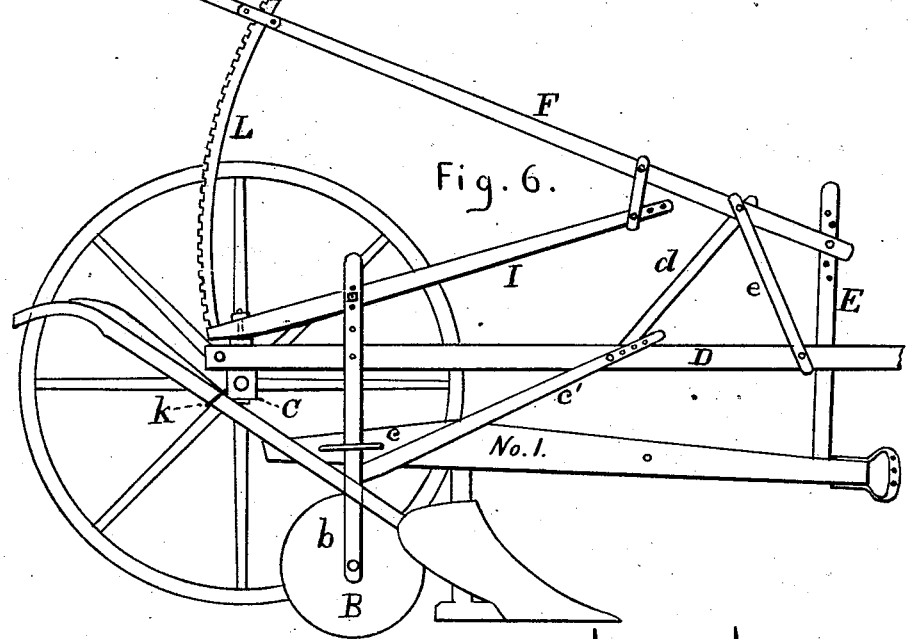

Figure 1 is a side elevation of the plows and operating devices rigged for horses. Fig. 2 is a back view of the same. Figs. 3 and 4 are top views of the devices arranged for right-hand and left-hand plows. Fig. 5 is a side elevation of the devices and plows rigged to be operated by oxen. Fig. 6 is a side elevation of the devices for operating a single plow.

My invention relates to gang-plows; and consists of the operating devices, so constructed, arranged, and combined that ordinary plows, without material alteration, may be attached and operated singly or in gangs, and so as to be readily convertible into single or gang plow devices—right-hand or left-hand plow devices—to be operated by horses or oxen, and adjustable to plows of different widths, as hereinafter described.

A is a large wheel, arranged to run on the land, on an axle, $a$, the inner end of which is bolted to the rear part of the tongue when rigged for horses, and to the rear end of lever $I^2$ when rigged for oxen; and the axle is constructed so as to be readily changed, without alteration, to the other side of the devices, when left-hand plows are used. B is a small light cast wheel, having its bearings in standards $b$, bolted to lever I, and braced by brace $c^1$, the forward end of which is attached to the tongue, or to the beam of plow No. 1, as seen in Figs. 1 and 5 of the drawings, and the standard is arranged in guide $c$, so that the wheel runs in the furrow behind the plow. C is an axle, provided with right-and-left spindles, to be used as the axle of wheel A, when only a single right-hand or left-hand plow is used; and this axle answers the purpose of a head-block for holding the handles of plow No. 1 and the beam of plow No. 2, and the other devices attached to it, as herein described and shown. D is the tongue, the rear end of which is bolted to the axle C, and the forward end extends to the neck-yoke of the horses; and it forms the support of the arms connecting it with the operating-lever. E is a standard, the lower end of which is bolted to the equalizing-block and front end of the plow-beam No. 1, and extends through slide-block $c^2$ on the tongue, and the upper part is connected by a bolt to the forward part of lever F, which connects with the tongue by the arms $d\ e$, and extends beyond the standard to connect at the end with arm $e$, when used for oxen, as shown in Figs. 1 and 5 of the drawings. G is a draft-bar, the rear end of which is bolted to axle C, and the forward end to the equalizing-block $f$, which is made with a square hole to receive the standards E $E^2$, and is bolted to the forward end of plow-beam No. 1, and constructed so as to be readily changed to suit right or left hand plows, and the clevis is attached in the middle of the block to equalize the draft laterally. H is a brace, the rear end of which is bolted to axle $a$ near the outer end, and the forward end of the brace is bolted to the forward end of the draft-bar. I and K are levers for raising and lowering the plows, the forward ends of which levers are connected with the lever F by means of a fulcrum-clevis, $b'$, and fulcrum-blocks $d'$, and the rear end of lever I is bolted to the axle C on the top of the tongue, and by the same bolt which holds the tongue, and the rear end of lever K is bolted to the standard $g$, which is bolted to the beam of plow No. 2, as shown in the drawings; and lever K is also connected by a bolt to a fulcrum, $h$, attached to axle $a$ by bolts through a slot, $s'$, in the axle, so as to be adjustable to plows of different widths. L is the lever-arc bolted at the bottom to the side of the back end of the tongue, and is provided with a ratchet-rack to hold the spring-latch $i$ on the lever F. O is a guide-block bolted to the axle C, and arranged to guide the plow-beam No. 2, the forward end of which beam is bolted to the under side of the draft-bar G. To regulate the depth of this plow, a block may be placed between the end of the beam and the draft-bar, which block may be changed, as required, from the bottom to the top of the bar.

The operating devices are rendered convertible into devices adapted to be operated by oxen instead of by horses by means of levers $I^2$ $K^2$, arms $d^2 e^2$, and standards $E^2$ carrying caster-wheel $b^2$, which are substituted, respectively, in the places of tongue D, levers I K, arms $d\ e$, and standard E, the arm $e$, which is used in both, being shifted to the end of lever F, and connecting with lever $I^2$ serves as the lever-fulcrum, as shown in Fig. 5.

Axle C is made with slots S S to receive the bolts of the plow-handle clasps $k$, so as to render the clasps adjustable at any required position; and the axles, arms, braces, draft-bar, fulcrums, levers, and standards are all provided with bolt-holes, in such positions, and all the devices constructed of such size and shape, as to render them readily convertible into horse-plow devices, ox-plow devices, right-hand or left-hand plow devices, single or gang plow devices, and so as to be adjustable to plows of different widths. Any ordinary plow without alteration, except a few bolt-holes through the beam in such positions as will not weaken the beam, may be attached to and operated by these devices, so that the draft will be at the end of the plow-beam, and the plows may be raised and lowered as required, and the weight properly balanced, so as not to bear too heavily upon the necks of the horses.

With the horse-plow devices the plows are raised by lowering the rear end of lever F, and lowered by the reverse motion of the lever; and with the ox-plow devices the plows are raised by raising the rear end of the lever, and lowered by lowering the lever.

A seat for the operator is attached to the devices in the usual manner.

What I claim as new, and desire to secure by Letters Patent, is—

1. The combination of wheels A B, axles $a$ C, standard $b$, tongue D, standard E, arms $d$ $e$, draft-bar G, brace H, and levers F I K, constructed and adapted to be used as right-hand or left-hand plow devices, substantially as described.

2. In combination with wheels A B, axles $a$ C, standard $b$, lever F, draft-bar G, and brace H, the arms $d^2 e\ e^2$, standard and wheel $E^2\ b^2$, and levers $I^2\ K^2$, constructed and adapted to be operated with oxen, substantially as described.

3. The combination of axles $a$ C, standard $b$, brace $c^1$, lever F, and lever-arc L, draft-bar G, and brace H, constructed and adapted to carry either tongue D, standard E, arms $d\ e$, and levers I K, to operate the plows with horses, or to carry standard and wheel $E^2\ b^2$, arms $d^2 e\ e^2$, and levers $I^2\ K^2$, to operate the plows with oxen, substantially as described.

4. The combination of wheels A B, axle C, standard $b$, brace $c^1$, lever F, and lever-arc L, adapted to carry either tongue D, arms $d\ e$, standard E, and lever I, to operate a single plow with horses, or to carry arms $d^2 e\ e^2$, standard and wheel $E^2\ b^2$, and lever $I^2$, to operate a single plow with oxen, substantially as described.

HENRY BUMGARNER.

Witnesses:
 WILLIAM FISHER,
 JESSE LOYD.